June 11, 1968  T. B. RHINES  3,387,804

VALVE CONSTRUCTION

Filed April 24, 1967

INVENTOR.
THOMAS B. RHINES
BY Norman Friedland
ATTORNEY ized June 11, 1968

United States Patent Office 3,387,804
Patented June 11, 1968

3,387,804
VALVE CONSTRUCTION
Thomas B. Rhines, Glastonbury, Conn., assignor to United
Aircraft Corporation, East Hartford, Conn., a corporation of Delaware
Filed Apr. 24, 1967, Ser. No. 633,139
4 Claims. (Cl. 244—129)

ABSTRACT OF THE DISCLOSURE

A pair of valve elements hingedly supported so that the outer edges overlap and overlie each other are positioned relative to each for varying the area of an orifice for a cabin pressurization system wherein the ends of the valve element are contoured to change the direction of flow of the fluid passing therebetween for reducing the opening torque required.

Cross-reference to related application

This invention relates to an application entitled "Cabin Pressurization Outflow Valve," by F. Emmons filed on even date and assigned to the same assignee.

Background of the invention

This invention relates to the outflow valve of a cabin pressurization system and particularly to the valve configuration thereof.

Owing to the Bernoulli effect of the flow between the pivotal valve elements, the pressure acting on the valve tends to interfere with the opening thereof and hence, requires an increased relative torque necessary to position the valve from a closed to an open position. Obviously the torque necessary to effectuate opening will determine the size of actuator and particularly for aircraft applications it is abundantly important to keep the actuator as small as possible while also consuming the minimum amount of energy. As shown in the application entitled "Cabin Pressurization Outflow Valve" by F. Emmons, supra, the flow between the spaced valve elements reduces the static pressure acting thereon so that the pressure acting on the opposite surfaces of the valve elements adjacent thereto tends to urge the two elements together. I have found that I can obviate this problem by contouring the cooperating surfaces of the valve element such that the direction of flow is changed, imparting a momentum force to both elements in such a manner as to enhance the separation forces.

Summary of invention

The primary object of the present invention is to provide an improved outflow valve for cabin pressurization systems.

A still further object of the invention is to contour the inner surfaces of the outflow valve where flow is evident in such a manner as to impart a change in direction of the flow in order to reduce the torque level.

Description of the preferred embodiment

Figure 1:
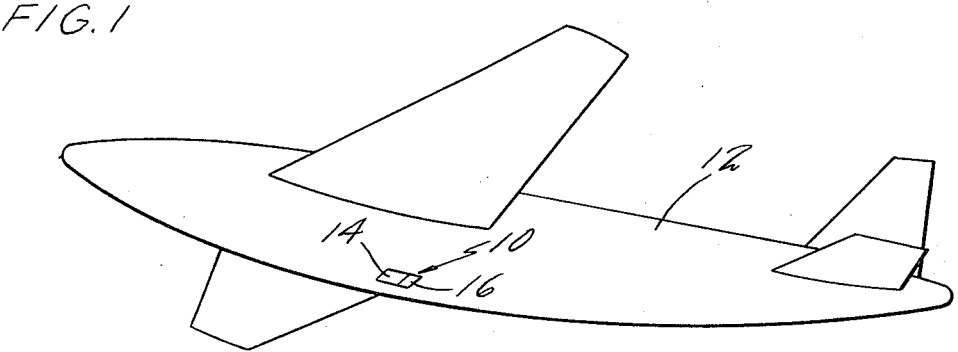
FIGURE 1 is a schematic illustration of an aircraft having mounted thereon an outflow valve.
Figure 2:
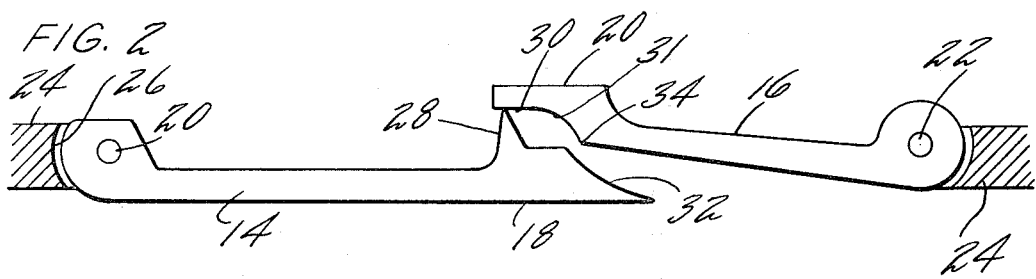
FIGURE 2 is a sectional view illustrating the details of the invention.

As shown in FIGS. 1 and 2 an outflow valve generally indicated by reference numeral 10 is suitably mounted on the underbody of fuselage of an aircraft generally illustrated by reference numeral 12 and serves to discharge cabin air to the ambient. The outflow valve 10 comprises a pair of hingedly supported flat plate-like valve elements 14 and 16 whereupon the outer extremities 18 and 20 respectively thereof are in overlapping relative positions for defining a seal in the closed position and a thrust nozzle in an open position. Valve elements 14 and 16 are respectively fixed to shafts 20 and 22 both suitably supported and grounded to the aircraft adjacent the skin of the aircraft 24 and are located in opening 26 formed therein. As was disclosed in application entitled "Cabin Pressurization Outflow Valve" filed by F. Emmons, supra, both valve elements are ganged to move in unison in such a manner that when valve element 14 is rotated in a clockwise direction, valve element 16 will also rotate in a clockwise direction, and vice versa. When the two valve elements are spaced relative to each other, the flow from the cabin passes therebetween, and is discharged overboard. Upward projection 28 is provided intermediate the pivot and the end of valve element 14 and its apex terminates at the extremity thereof so as to seat against the inner surface 30 formed on the end 20 of element 16. As can be seen from FIG. 2, the inner surface 31, next adjacent the seat 30, is stepped and contoured to form a concaved surface for causing the flow passing therebetween to change direction when impinging thereon. Surface 30 causes the flow to be directed to the contoured stepped concaved section 32 formed on the end 18 of the valve element 14 noting that it is in substantially axial alignment with the contour 32, for assuring a smooth flow between the valve elements passing therethrough. It is apparent from the foregoing that as the flow passes between ends 18 and 20 of elements 14 and 16 it first impinges on the concaved section 30 whereupon its direction is slightly changed and imparting a momentum force to the valve element 16 and then directed to the concave section 32 of valve element 14 whereupon the flow direction is again changed for imparting a momentum to the valve element 14. In this manner the momentum acting on elements 14 and 16 which is a function of the force and the distance from the axis of each element will determine the amount of torque imparted to each arm. This torque serves to impart an automatic opening force to the valves thus relieving the amount of force necessary which would otherwise be required by the actuators.

Claims

It should be understood that the invention is not limited to the particular embodiments shown and described herein, but that various changes and modifications may be made without departing from the spirit or scope of this novel concept as defined by the following claims.

I claim:
1. An outflow valve for discharging fluid from a cabin of an aircraft so as to maintain a predetermined pressure therein comprising,
   a pair of cooperating valve elements each pivotally mounted about parallelly spaced axes,
   said valve elements extending from said axes into an opening formed in the skin of the aircraft and lying substantially flush with the skin when in a closed position,
   the end portions carried by said valve elements adapted to overlap each other and movable relative to each other to define a nozzle so as to permit fluid to flow therebetween, and
   means associated with at least one of said end portions for changing the direction of the fluid flowing therebetween.
2. An outflow valve as claimed in claim 1 wherein said means includes a contoured recess formed in one of said valve elements for directing the fluid to flow in a direction transverse to the valve element.

3. An outflow valve for discharging fluid from a cabin of an aircraft so as to maintain a predetermined pressure therein comprising,
- a pair of cooperating valve elements each pivotally mounted about parallelly spaced axes,
- said valve elements extending from said axes into an opening formed in the skin of the aircraft and lying substantially flush with the skin when in a closed position,
- the end portions carried by said valve elements adapted to overlap each other and movable relative to each other to define a nozzle so as to permit fluid to flow therebetween,
- a seat formed adjacent the end of one of said end portions,
- a projection extending upwardly toward said seat to engage said seat formed on the other of said end portions, but spaced from the end thereof, and
- means in said end portions for changing the direction of fluid flowing adjacent thereto.

4. An outflow valve as defined in claim 3 wherein said means includes a concaved recess formed in one of said end portions between said seat and said axis and another concaved recess formed in the other of said end portions between said projection and the end of said end portion.

References Cited

UNITED STATES PATENTS

| | | | |
|---|---|---|---|
| 1,562,663 | 11/1925 | Strong | 98—1.5 |
| 2,317,994 | 5/1943 | Huff | 98—121 |
| 2,962,956 | 12/1960 | Magyar | 98—121 |
| 3,360,005 | 12/1967 | Sopher et al. | 98—121 |

MILTON BUCHLER, *Primary Examiner.*

J. PITTENGER, *Assistant Examiner.*